United States Patent Office 3,324,168
Patented June 6, 1967

3,324,168
PROCESS FOR THE PRODUCTION OF NITRATE ESTERS OF α-HYDROXY-CARBOXYLIC ACIDS FROM α-OLEFINS
Walter Müller, Leonding, near Linz, and Ferdinand Weinrotter, Linz, Austria, assignors to Osterreichische Stickstoffwerke Aktiengesellschaft, Linz, Austria
No Drawing. Filed Feb. 21, 1966, Ser. No. 528,830
Claims priority, application Austria, Mar. 5, 1965, A 1,931/65
7 Claims. (Cl. 260—467)

The present invention relates to a process for the preparation of nitrate esters of α-hydroxy-carboxylic acids and of α-hydroxycarboxylic acid esters and to novel nitrate esters of α-hydroxy-carboxylic acids and of α-hydroxycarboxylic esters.

It is known that isobutylene can be converted into the nitrate ester of α-hydroxyisobutyric acid by treatment with dinitrogen tetroxide in nitric acid as the reaction medium, using vanadium pentoxide as the catalyst.

Heretofore, it also has been described that this reaction cannot be applied to ethylene.

In the case of higher straight-chain α-olefins it is known that on treatment with dinitrogen tetroxide they react with addition to the double bond, to give nitro-nitrites and dinitro-compounds, of which the former can be converted into nitro-nitrates by further reaction, or into nitroalcohols by saponification. It is not clear from the literature whether, in the case of such higher straight-chain α-olefins, an oxidation reaction analogous to the formation of the nitrate ester of α-hydroxyisobutyric acid from isobutylene is possible. In view of this reaction failing in the case of ethylene, success of such a reaction with higher straight-chain α-olefins was not to be expected. Surprisingly it has now been found that it is possible to convert liquid or solid straight-chain α-olefins of at least 5 carbon atoms, or mixtures of such olefins, into nitrate esters of the corresponding α-hydroxy carboxylic acids or α-hydroxycarboxylic acid esters by working in a liquid medium, maintaining a certain reaction temperature, introducing the olefin into the $N_2O_4$, and ensuring fine distribution of the olefin in the reaction mixture.

Thus, according to the present invention there is provided a process for the preparation of a nitrate ester of an α-hydroxycarboxylic acid or of an α-hydroxylic carboxylic acid ester or a mixture of such nitrate esters having the formula:

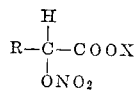
(I)

in which R represents a linear alkyl group containing at least 3 carbon atoms and X represents a hydrogen atom or a lower alkyl group, which comprises introducing, in a finely divided state, an aliphatic linear α-olefin having at least 5 carbon atoms, or a mixture of such olefins, and at least an equimolar amount of oxygen, into at least an equimolar amount (based on the olefin) of liquid dinitrogen tetroxide at a temperature within the range of $-10°$ C. to $+40°$ C., and removing excess nitrous gases from the reaction product at a temperature not exceeding 60° C., and if desired, subsequently esterifying the carboxyl group in known manner.

Certain of the nitrate esters produced by the above process are novel compounds. Accordingly, the present invention also provides a nitrate ester of an α-hydroxycarboxylic acid or of an α-hydroxycarboxylic acid ester having the formula

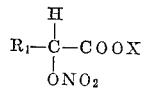
(II)

in which $R^1$ represents the linear alkyl group containing 4 to 12 carbon atoms and X represents a hydrogen atom or a lower alkyl group.

In the process according to the invention, either pure olefins or mixtures of olefins may equally well be used for the reaction. In the latter case mixtures of the desired nitrate esters of α-hydroxycarboxylic acids or of α-hydroxycarboxylic acid esters are produced. An olefin or olefin mixture which additionally contains one or more saturated aliphatic hydrocarbons is also suitable for the reaction of the invention and in some cases, especially were solid olefins are used as the starting material, it is particularly advantageous to admix saturated aliphatic hydrocarbons therewith before introducing the material into the liquid reaction medium.

It is a prequisite for the success of the process of the present invention that the starting olefins, which are in liquid or solid form under normal conditions, should be distributed into the reaction mixture in as finely divided a form as possible, with the olefin being, for example, introduced into the liquid dinitrogen tetroxide with good stirring. The oxygen used in the process may be introduced as pure oxygen or in the form of an oxygen-containing gas, e.g. air.

According to a preferred embodiment of the invention the olefin starting material is atomised with oxygen or air in a nozzle, and the jet is brought under the surface of, or near to the surface of, the liquid reaction mixture, which consists, in addition to any end product already formed, principally of liquid dinitrogen tetroxide. If low molecular weight olefins, which are relatively volatile, are used as the starting material, for example pentene-1, then it is advisable to follow the reaction vessel by a second reaction vessel containing liquid dinitrogen tetroxide, if considerable olefin losses are to be avoided.

The reaction is successful if one mol of olefin is reacted with one mol each of oxygen and of dinitrogen tetroxide. It is, however, advisable to increase both the amount of oxygen and the amount of dinitrogen tetroxide to above the equimolar quantities. In the case of the increased amount of oxygen this is in order to suppress the formation of $N_2O_3$ in the reaction mixture as far as possible, and in the case of the increased amount of $N_2O_4$ is is because it has proved advantageous for the latter simultaneously to serve as the reaction medium. In practice, a ratio of 1 mol of olefin to 3 to 5 mols of oxygen and 3 to 5 mols of $N_2O_4$ has proved particularly successful.

The reaction temperature can be varied as desired, wtihin the limits stated, without significantly affecting the course of the reaction, but must under no circumstances exceed the limit of $+40°$ C. since otherwise undesirable side reactions occur. It is advisable and in accordance with economic considerations to work at a temperature within the range of 0° to 20° C., and this is recommended. The reaction can be carried out at normal pressure or superatmospheric pressure. In same cases the course of the reaction is favourably affected by the presence of an oxidation catalyst, for example selenium dioxide or vanadium pentoxide.

When the reaction is complete the reaction mixture has to be freed of excess $N_2O_4$, and this may be done by any normal mild method. The internal temperature must therefore not exceed 60° C. Removal of $N_2O_4$ by thin film evaporation is very advantageous. After removal of the $N_2O_4$, the evaporation residue is poured into water.

The crude nitrate ester may be recovered from the aqueous mixture by simple separation of layers, or by extraction, depending upon its solubility. The lower nitrate esters can be further purified by distillation in the form of their metyl esters. The higher esters are however no longer distillable and they are best purified by converting them into a salt of the carboxylic acid, whereupon neutral impurities can be removed by means of organic solvents. However, purification may be also realised by fractional crystallisation methods or treatment with selective solvents.

If it is intended to produce the nitrate esters of the α-hydroxycarboxylic acid esters then it is possible directly to esterify the residue remaining after the $N_2O_4$ evaporation by treatment with aliphatic alcohols following conventional esterification methods, for example in the presence of an esterification catalyst such as sulphuric acid, p-toluenesulphonic acid or boron fluoride. The esters can then be further purified by distillation.

Alternatively, the purified nitrate esters of the α-hydroxycarboxylic acids can be subjected to esterification.

The nitrate esters of α-hydroxycarboxylic acids and α-hydroxycarboxylic acid esters obtained according to the process of the invention, including the novel compounds of Formula II herein, may be used as intermediate compounds in a new simple method for the preparation of straight-chain, aliphatic, α-hydroxycarboxylic acids and of their esters, which are valuable industrially useful products. They may for example be used as wetting agents and in plant protection. The nitrate esters themselves are interesting solvents.

The following examples illustrate the invention.

*Example 1*

220 g. of liquid $N_2O_4$ are introduced with stirring into a flask equipped with a gas inlet tube and a reflux condenser, and are cooled to 0° C. 50 g. of pentene-1 are introduced at 0° to 5° C. with intense stirring over the course of 3 hours, oxygen being passed in at the same time. The gas which escapes is again passed through 100 g. of $N_2O_4$ in a reaction vessel attached to the reflux condenser, in order to completely convert the remaining portion of the pentene-1. When the reaction is completed the excess $N_2O_4$ is driven off in a slow stream of oxygen at a temperature of from 50° to 60° C. The residue is subsequently introduced into 750 ml. of methanol and esterified with the addition of sulphuric acid. After 8 hours the methanol is distilled off, the reaction product is poured into water, and the crude ester is separated off and fractionally distilled under reduced pressure. The pure nitrate ester of methyl α-hydroxyvalerate so obtained, of formula $C_3H_7.CH(ONO_2).COOCH_3$, boils at 92° to 96° C. at 10 mm. pressure. The yield is 72% of theory.

*Example 2*

220 g. of liquid $N_2O_4$ are introduced into a flask and cooled to 0° C. Using a nozzle designed for two materials, 50 g. of heptene-1 are uniformly sprayed into the pre-introduced $N_2O_4$ by means of the oxygen which is passed in, with the temperature being kept at 0° to 10° C. In this mixture, the amount of oxygen is at least 1 mol of oxygen per mol of heptene-1. When the reaction is completed the excess $N_2O_4$ is driven off in a slow stream of oxygen at a temperature of from 50° to 60° C. The residue is subsequently esterified with methanol as described in Example 1, and the ester is isolated. 75 g. of the nitrate ester of methyl α-hydroxy-oenanthate are thus obtained, corresponding to a yield of 72% of theory. The ester boils at 110° to 115° C. at 10 mm. Hg.

*Example 3*

50 g. of octene-1 are introduced into $N_2O_4$ in an analogous manner to Example 2, being sprayed with oxygen, and are allowed to react at about 10° C. When the reaction is completed the excess $N_2O_4$ is removed in a stream of oxygen at 50° to 60° C., the residue is poured into 300 ml. of water and the carboxyl group neutralised with 10% caustic soda, whereupon the nitrate ester dissolves in water as the sodium salt. After adding 100 ml. of ether the aqueous phase is separated off and the free acid recovered by acidification. 70 g. of the nitrate ester of α-hydroxycaprylic acid, corresponding to a yield of 76.5% of theory, are obtained.

In a similar manner, decene-1, dodecene-1 and tetradecene-1 may also be converted to the nitrate esters of α-hydroxycapric acid, α-hydroxylauric acid and α-hydroxymyristic acid, respectively.

*Example 4*

50 g. of octadecene-1 are introduced into 300 g. of $N_2O_4$ containing 15 g. of nitric acid and 10 g. of vanadium pentoxide, whilst passing in oxygen as described in Example 2. The reaction temperature is maintained at 0° C. After distilling off the $N_2O_4$ the reaction mixture is esterified with ethanol as specified in Example 1. 67 g. of the crude nitrate ester of ethyl α-hydroxystearate are thus obtained.

*Example 5*

500 g. of a technical grade mixture of α-olefins having 8, 9 and 10 carbon atoms, and consisting of 80% α-olefins having a mean carbon atom number of 9, 7% of other, internal, olefines, and saturated aliphatic hydrocarbons as the remainder, are sprayed over the course of 3 hours by means of 300 l. of oxygen, using a nozzle for two materials, into 1200 g. of pre-introduced liquid $N_2O_4$. During this introduction the temperature is maintained at 10° to 15° C. by external cooling. When the introduction is complete, the mixture is stirred for a further hour at 20° C. and the excess $N_2O_4$ is then driven off in a thin film evaporator in vacuo over the course of one hour, with the internal temperature not exceeding 60° C. during this operation. The evaporation residue is converted into the sodium salt by means of 107 g. of caustic soda, whilst avoiding local alkalinity, and the neutral impurities are then removed by means of ether. After acidification 570 g. of a mixture of the nitrate esters of α-hydroxycaprylic acid, α-hydroxypelargonic acid and α-hydroxycapric acid are obtained. The nitrogen content of the mixture is 6.3%.

*Example 6*

300 g. of a technical grade mixture of α-olefins having 18, 19 and 20 carbon atoms, consisting of 87% of α-olefins having a mean carbon atom content of 19 carbon atoms, 5% of other, internal, olefins, and saturated aliphatic hydrocarbons as the remainder, are mixed with 100 g. of n-heptane. This mixture is atomised in a nozzle for two materials over the course of 3 hours, using a total of 100 l. of oxygen, and is introduced in this way with stirring into 420 g. of liquid $N_2O_4$ in a flask, at 0° to 10° C. The mixture is stirred for one hour at 20° C. after introduction, and is thereafter freed of excess $N_2O_4$ in a thin film evaporator. The crude acid so obtained is, after solution in 32 g. of aqueous NaOH, freed of neutral substances by adding toluene, and subsequently liberated by acidification. One thus obtains 280 g. of a mixture of the nitrate esters of α-hydroxystearic acid, α-hydroxyarachidic acid and α-hydroxynonadecanecarboxylic acid having a nitrogen content of 3.9%, corresponding to a yield of 79% of theory.

We claim:

1. In a process for the preparation of a nitrate ester of the formula $$\underset{ONO_2}{\underset{|}{R-\overset{H}{\underset{|}{C}}-COOH}} \qquad (I)$$

in which R is linear alkyl with 3 to 18 carbon atoms and mixtures of such compounds of Formula I, the step, which comprises introducing in a finely divided state, an aliphatic linear α-olefin having 5 to 20 carbon atoms, or a mixture of such olefins, and at least an equimolar amount of oxygen, into at least an equimolar amount (based on the olefin) of liquid dinitrogen tetroxide at a temperature within the range of −10° C. to +40° C., and removing excess dinitrogen tetroxide from the reaction product at a temperature not exceeding 60° C.

2. In a process for the preparation of a nitrate ester of the formula

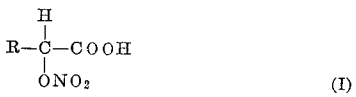

(I)

in which R is linear alkyl with 3 to 18 carbon atoms and of mixtures of such compounds of Formula I, the step, which comprises introducing, in a finely-divided state, an aliphatic linear α-olefin having 5 to 20 carbon atoms, or a mixture of such olefins, and oxygen in a ratio of 1 mol of the olefin to 3 to 5 mols of oxygen, into 3 to 5 mols (based on the olefin) of liquid dinitrogen tetroxide at a temperature within the range of −10° C. to +40° C., and removing excess dinitrogen tetroxide from the reaction product at a temperature not exceeding 60° C.

3. In a process for the preparation of a nitrate ester of the formula

(I)

in which R is linear alkyl with 3 to 18 carbon atoms and of mixtures of such compounds of Formula I, the step, which comprises introducing, in a finely-divided state, an aliphatic linear α-olefin having 5 to 20 carbon atoms, or a mixture of such olefins and oxygen in a ratio of 1 mol of the olefin to 3 to 5 mols of oxygen, into 3 to 5 mols (based on the olefin) of liquid dinitrogen tetroxide at a temperature within the range of 0° C. to +20° C., and removing excess dinitrogen tetroxide from the reaction product at a temperature not exceeding 60° C.

4. A process as claimed in claim 3, in which the olefin or olefin mixture is introduced into the reaction mixture as a mixture with saturated aliphatic hydro carbons.

5. A process as claimed in claim 3, in which the reaction is carried out in the presence of an oxidation catalyst.

6. A process as claimed in claim 3, in which the reaction is carried out in the presence of an oxidation catalyst selected from the group consisting of selenium dioxide and vanadium pentoxide.

7. A process as claimed in claim 3, in which the removal of the excess dinitrogen tetroxide is carried out by thin film evaporation.

References Cited
UNITED STATES PATENTS 2,847,453  8/1958  Gardner et al. _____ 260—466
2,971,981  2/1961  Aries _____ 260—533

OTHER REFERENCES

Stevens: J. Am. Chem. Soc., vol. 81, pp. 3593 to 3597 (1959).

CARL D. QUARFORTH, *Primary Examiner.*

L. A. SEBASTIAN, *Assistant Examiner.*